United States Patent [19]
Giraud

[11] Patent Number: 5,585,958
[45] Date of Patent: Dec. 17, 1996

[54] ELECTROCHROMIC LIGHT MODULATION DEVICES, IN PARTICULAR SCREENS AND DISPLAY UNITS

[75] Inventor: André Giraud, Levallois-Perret, France

[73] Assignee: Compagnie Generale d'Innovation et de Developpement Cogidev, Rueil-Malmaison, France

[21] Appl. No.: 313,318

[22] PCT Filed: Apr. 8, 1993

[86] PCT No.: PCT/FR93/00358

§ 371 Date: Oct. 7, 1994

§ 102(e) Date: Oct. 7, 1994

[87] PCT Pub. No.: WO93/21558

PCT Pub. Date: Oct. 28, 1993

[30] Foreign Application Priority Data

Apr. 10, 1992 [FR] France ................... 92/04445

[51] Int. Cl.⁶ ........................................ G02F 1/15
[52] U.S. Cl. ................... 359/265; 359/275; 359/315; 359/321
[58] Field of Search ................... 359/265, 266, 359/268, 259, 274, 275, 315, 316, 321

[56] References Cited

U.S. PATENT DOCUMENTS

| | | | |
|---|---|---|---|
| 4,403,831 | 9/1983 | Amano | 359/321 |
| 4,636,799 | 1/1987 | Kubick | 359/315 |
| 4,874,229 | 10/1989 | Ito et al. | 359/275 |
| 4,957,352 | 9/1990 | Yasuda et al. | 359/275 |
| 5,161,048 | 11/1992 | Rukavina | 359/275 |
| 5,403,680 | 4/1995 | Otagawa et al. | 359/275 |

FOREIGN PATENT DOCUMENTS

| | | |
|---|---|---|
| 0400797 | 12/1990 | European Pat. Off. . |
| 2274123 | 1/1976 | France . |
| 2446532 | 8/1980 | France . |
| 2618567 | 7/1987 | France . |
| 2618571 | 7/1987 | France . |
| 2034526 | 6/1980 | United Kingdom . |

OTHER PUBLICATIONS

M. A. Habib, "Electrochromic Matreials For Automotive Applications", SAE Technical Paper Series, No. 910542, Feb. 25–Mar. 1, 1991, pp. 1–10.
H. Demiryont, "Electrochromic Automotive Glasss", SAE Technical Paper Series, No. 910545, Ford Motor Co., Feb. 25–Mar. 1, 1991, pp. 1–9.
Patent Abstract of Japan, vol. 9, No. 44, p. 337(1767) 23 Feb. 1985 and JPA 59–184328 Nissan, see Abstract.
Patent Abstract of Japan, Vol. 9, No. 44 (P–337) (1767) 23 Feb. 1985 and JP, A, 59 184 (Nissan) see abstract.
Patent Abstract of Japan, vol. 015, No. 399 (P–1261) 7 Oct. 1991 & JP, A, 03 158 831 (Tokyo Electric Co) see abstract.

*Primary Examiner*—Loha Ben
*Attorney, Agent, or Firm*—Cushman Darby & Cushman, L.L.P.

[57] ABSTRACT

A device comprising a clear substrate (24) supporting at least one thin, clear, electronically conductive work electrode (23); a substrate (5, 3) supporting at least one electronically conductive counter electrode (2); at least one intermediate layer (25,26) providing electrochromism; and a means for supplying current to the ends of the electrodes (23) and counter electrodes (23) and counter electrodes (2), optionally combined with a means for supplying current into said clear electrodes (23) and/or counter electrodes. An array of counter electrodes configured in fine lines and/or an additional current supplying means may be formed by means of a fabric, lap or grid assembly of conductive (2) and non-conductive (3) wires (3) being arranged with respect to wire (2) in such a way that the latter are kept apart, and/or that the strength of the assembly is promoted.

52 Claims, 4 Drawing Sheets

ELECTROCHROMIC LIGHT MODULATION DEVICES, IN PARTICULAR SCREENS AND DISPLAY UNITS

FIELD OF THE INVENTION

This invention concerns electrochromic light modulation devices, in particular devices for variable light reflection, variable light transmission, and the display of signals and images, for example, the display of alphanumeric or graphic information. By way of example, these devices include display panels and screens of the most varied dimensions and shapes, windows, showcases, screens, windscreens, spectacles with variable transparency, and mirrors with variable reflection.

BACKGROUND OF RELATED ART

Numerous electrochromic processes have been proposed and described for modulating light in transmission or reflection in order to display signals and images. These processes provide displays, screens, mirrors or other objects which, totally or partially, reflect or transmit light according to instructions transmitted to them by electrical means.

These electrochromic processes function in accordance with the laws of reversible electrolysis and use the reversible change in color and/or of optical density obtained by electrochemical oxydo-reduction of a so-called "electrochromic" material, the oxidized form and the reduced form of which are of different colors and/or optical densities.

Basically, an elementary light modulating cell, which functions according to an electrochromic process, comprises two electrodes separated by an electrolytic medium consisting of one or several layers. One of the electrodes at least (in the case of a reflection function) should be transparent. Various devices well known to those of ordinary skill in the art protect the electrodes, transmit the current, protect the layer(s) of the electrolyte, and provide the geometric shape of the cell. French patent FR-B-2 618 567 describes such a device for the light modulating.

Electrochromic light modulation processes afford a group of characteristics which may be advantageous for certain applications and which have often been cited. In particular, the following advantages exist:

the possibility of a memory with an open circuit;

a low control voltage;

a fairly large tolerance in the distance between electrodes;

energy consumption limited to that necessary to cause a change in the state of the electrolytic medium and which may therefore be reduced even further for certain uses.

As regards display applications, it is possible, for some of these processes, to obtain an excellent contrast, even in side vision with a high angle. Contrary to the situation with some processes which operate by transmission of polarized light, and those which have poor visibility in daylight, this process is very suitable for electrochromic display units-operating by reflection, even when they are placed outside in strong sunlight.

The practical achievement of these advantages is subject, however, to the solution of certain operating difficulties which the different processes proposed are intended to reduce.

Thus, for example, the need to avoid deterioration, indeed the disappearance of the electrolytic medium, resulting in the degradation and the inadequate lifetime of the cell, is at the basis of a large number of proposals regarding the choice of the electrolytic layer(s), and the practical creation of rigorously sealed cells. Other problems concern the practical difficulty of installing the components of the electrolytic medium. For example, it is very difficult, if not impossible, to obtain, with an electrolytic liquid, electrochromic cells of very small dimensions. The following procedure is used at present, in particular in the case of small pixel screens or displays obtained from transparent "columns" and "lines" on a non-transparent base:

The transparent electrode is created from a conductive transparent layer which is itself deposited onto a transparent substrate, such as glass or a transparent plastic material. This transparent conductive layer is made up of one or several metals or oxides, such as, for example, gold, silver, tin oxide (TO), indium tin oxide (ITO), zinc oxide and cadmium stannate etc, as mentioned in the literature. In order to remain transparent, these layers must be very thin (some hundredths to some thousandths of an Angström). Various very well known processes are therefore used very economically to deposit these materials, such as spraying powders or liquids which decompose on to the hot substrate, chemical vapor deposition (CVD), depositions under vacuum, or even chemical precipitations. Nevertheless, the slight thickness required does not make it possible to obtain a high level of conductivity in the layer, the conductivity being proportional to the thickness for a given metal or oxide and for a given deposition process. A compromise must be made between transparency and thickness.

Furthermore, these transparent electrodes are created in the form of fine lines insulated from each other (which will form the "columns" of the screen or the display), either by depositing a continuous transparent conductive layer over the whole surface of the transparent substrate, and then "engraving" it by processes currently used in photolithography, or by covering the surface of the transparent substrate with an appropriate mask and then depositing the conductive metal or oxide, the deposition being effected solely on the areas of the columns left accessible by the mask, which is subsequently removed.

On the basis of known techniques, it is therefore possible to create transparent electrodes of the desired fineness, but one problem still persists when the screen is to have large dimensions because the electrochromic process imposes a slight ohmic loss and a relatively high current. The resistance of the column which transmits the control is then too high and it is not sufficient to supply the current to the two ends of the column. It is advisable to provide additional supplies of current to the transparent electrode between the two ends of the column, i.e. into the interior of the screen itself. It may be mentioned in passing that this problem also arises with screens or displays with small transparent pixels, i.e. in which the "lines" are obtained in the same way as the columns, in which case it may also be necessary to supply additional current to lines of large dimensions. A similar problem is presented in the case of displays, or more generally, in light modulators, be they non-transparent or transparent. The light modulators are comprised of large dimension pixels, the form of which corresponds, for example, to that of letters in the case of non-transparent displays, or to that of the modulator itself, for example, in the case of glass panes which can be darkened electrically. In this case, the objective is to distribute the current into the interior of the large dimension pixel.

Various solutions have been proposed to solve the problems which have just been described, but they are all impractical.

Some consist of forming a very conductive "counter-column" on the back of the screen and of making the counter-column communicate with the ITO column, for example, at certain points by means of "nails" or "rivets" crossing the film which supports the "lines", then crossing the electrolytic layer(s). This operation is delicate and costly, as the "nail", of very small dimensions, must be placed in position with great precision. There may be several per column and there may be several hundred columns.

The "nail" must be insulated in the part which crosses the electrolyte layer(s). In addition, it must, however, be in contact with the transparent conductive layer, made of a non-corrodible conductive material (or protected against corrosion also at the point of contact). It must finally be in contact with the counter-column, which requires soldering or adhesion operations of a precise and delicate nature.

Another solution consists of fixing, along the column, a conductive wire so fine that it is almost invisible, to supply the current, in contact with the conductive layer, and non-corrodible or protected against corrosion. It is indeed known that the visibility of a line is practically nil if it is seen at an angle ranging from some tens of seconds to one minute of an arc. This very fine wire should be placed with great precision from the top to the bottom of the column.

In these small pixel screens and displays, the creation of the non-transparent electrodes (also referred in the present description by the term "counter electrodes") is simpler in principle as it does not have to conform to a thickness limit imposed by the transparency. When large pixels are to be created, the use of counter-electrode materials available in the form of very thin sheets and layers has been proposed in previous technology.

The most interesting electrochromic processes use, however, electrolytic materials which are more or less corrosive, sometimes which are very corrosive, and thus the choice of material used for manufacturing the counter-electrode in these processes is a matter of some importance. It must both conduct the current and not be liable to be corroded by the electrolyte at rest or in operation. To this effect pliable sheets of pyrolytic graphite, a plastic material loaded with particles of carbon or metal, certain conductive pastes for serigraphy, graphite or carbon fabrics or cloths have been suggested.

When the creation of a screen with numerous very small pixels is desired, the counter-electrodes which will form the "lines" of the screen must be made in the form of fine strips insulated from each other. For this it has been proposed that a conductive sheet of the type mentioned in the previous paragraph should be cut into fine strips which must then be stuck alongside each other on a suitable support, separated by a narrow interval. If the sheet is made, for example, from conductive metal covered with a protective varnish, the cut edge must also be provided after cutting with a protective varnish if one wishes to prevent the electrolytic medium (media) from attacking the counter-electrode at the cut edge. One can imagine that a process of this kind would be expensive, and almost impracticable due to a certain degree of fineness required for the "lines".

This is why other methods have been proposed, based on the deposition of the material making up the counter-electrode by a printing process, such as that of serigraphy or ink jet, but these processes themselves encounter certain difficulties which make the creation of very fine and non-corrodible conductive counter-electrodes difficult, if not impossible. Thus, for example, the precision which can be achieved by serigraphy does not lend itself well to the deposition of several layers by successive coating, some of them—such as silver paste—, intended to ensure the conductivity of the line, others,—such as ink filled with graphite—, intended to ensure the protection of this line against corrosion. The ink jet, another process which might produce the desired fineness, does not tolerate well chemical compositions containing particles or micelles which are to be deposited, these particles or micelles blocking the distribution tube or obstructing the splitting-up of the jet into sufficiently fine drops.

SUMMARY OF THE INVENTION

The present invention aims at resolving the drawbacks, which have just been outlined, in the creation of light modulation devices functioning according to an electrochromic process. In the case of screens or displays comprising a large number of small cells controlled by a multiplex matrix method, sufficiently fine conductive lines and columns are required. The "columns" are, for example, placed on the transparent front surface of the screen or display, and the "lines" on the non-transparent rear surface, with the electrolytic medium being placed in between. Several layers may be employed are highly corrosive. In the case of columns of considerable length, current supplies at points other than the two may be necessitated, this objective of additional current supplies applying equally to modulators of the above type in which the counter-electrodes are also transparent as well as to the modulators already mentioned comprising large dimension pixels.

According to the invention, for the types of modulators which have just been mentioned in the previous paragraph, the network of counter-electrodes are created in fine lines and/or an additional current supply device can be provided inside the modulator in the form of an assembly of conductive wires or fibers. The conductive wires or fibers are insulated and/or held in place by other non-conductive wires. This assembly is created by techniques suitable for very high productivity and derived from technologies which have proved themselves to be acceptable in the textile industry.

In the case of the network of counter-electrodes in fine lines, numerous possibilities for assemblies are offered, as illustrated below, and the regularity of the wires and the precision and output performances of the textile machines make it possible to create, under very economic conditions, a composite fabric or cloth based on conductive and non-conductive wires, which supplies with precision the fine conductive lines required, perfectly insulated from each other, with extremely fine and regular spacing. This additional current supply device assembly according to the invention will advantageously take the form of a grid with conductive weft wires and non-conductive warp wires, or vice versa; it will thus be possible to place in position at one go a conductive wire unit to supply additional current, which will facilitate the manufacture of all types of modulators, affording in this case the added advantage of a relatively precise positioning of the grid in relation to the fine network of columns of transparent electrodes, if need be, of transparent counter-electrodes, for small pixel screens or displays.

The present invention therefore has as objective of providing a light modulation unit operating according to an electrochromic process, comprising:

a first substrate, transparent or substantially transparent, having at least one working electrode, in a thin layer, transparent or substantially transparent and being electronically conductive.

A second substrate is placed at a distance transversely in relation to the first substrate and has at least one electronically conductive counter-electrode. The second substrate and the associated counter-electrode(s) may be transparent or substantially transparent.

The lay-out of the electrodes and counter electrodes on their respective substrate and their relative arrangement are selected so as to form a cell or juxtaposition of cells for modulating light.

At least one layer of electrolytic material is between the working electrode(s) and counter-electrode(s), the composition of which makes it possible to ensure electrochromism.

An electric current is supplied to the ends of the working electrode(s) and counter-electrode(s), which may be completed by means of supplying electric current within the working electrode(s) and/or counter-electrode(s) if the latter is (or are) transparent or substantially transparent. It is possible to provide means of addressing in the case of a juxtaposition of cells in order to control them selectively.

Means for protecting the working electrodes and counter-electrodes and means for protecting the layer(s) of electrolytic material are also provided.

The present invention is characterized in that, for the creation of a network of counter-electrodes which is to be structured according to fine lines and/or for the creation of means of supplying additional current to the electrodes and/or counter electrodes in the case where the latter are transparent or substantially transparent, an assembly of conductive wires and non-conductive wires is formed, of a fabric, sheet or grid, the non-conductive wires being arranged in relation to the conductive wires so as to ensure a separation of the latter and/or to contribute to the strength of the assembly.

To form the network of counter-electrodes, a non-corrodible conductive wire is used, for example a carbon fiber (it is advisable to choose preferably fibers with high conductivity) or a metal or alloy wire not corroded by the chosen electrolytic medium, including when the current passes into the cell (this might be, for example, stainless steel 18-10, or in certain cases, titanium, tungsten or chromium, etc.) or again a conductive metal wire protected from contact with the electrolytic medium by means of a reasonably conductive varnish, formed, for example, by particles of graphite in a polymerizable binder, such as are found in the trade.

To make up an additional current supply assembly within a working electrode or a network of working electrodes or a counter-electrode or a network of transparent counter-electrodes, a conductive wire of the same type as before, with very good conductivity, is used. If it is made from a corrodible metal, it is advantageously provided with a sheath of thermoplastic material, which is able to yield under the application of heat and pressure when placed in contact with the electrode(s) or counter-electrode(s) to release the conductor along the contact generators.

The non-conductive wires of an assembly are made up of non-conductive fibers, such as glass, polyester and polyamide, etc., which may have an external thermoplastic covering so that the assembly may be subjected to a hot calendaring operation to give it improved strength. As, however, the electrical insulation maintained by these wires is only necessary in a direction perpendicular to their axis, it is also possible to use as the non-conductive wire metal wires or conductive fibers covered with an insulating sheath provided that the latter is resistant to the operations involving the highest temperatures used in the manufacture or use of the display or screen.

In the case where the electrodes and counter-electrodes are created according to fine lines for the purpose of controlling the device by a multiplex matrix method, the network of counter-electrodes is advantageously formed by the conductive wires of a warp obtained by warping alternately n adjacent conductive wires and p adjacent non-conductive wires, n and p each being at least equal to 1, groups of adjacent wires possibly being replaced by strips each obtained by lamination of a larger section wire.

According to a first variant, the warp obtained by warping is made an integral part by the use, on its surface opposite that in contact with the electrolytic medium, of an adhesive film constituting the basic substrate. According to a second variant, the assembly of warp wires is held together by a weft of nonconductive wires, the gap between which is equal to the spacing of the pixels along the warp wires or a complete multiple of this spacing.

A conductive varnish and/or some layers constituting the electrolytic medium may have been applied to the individual conductive wires (or strips) of these networks of counter-electrodes, before their assembly by warping, or may be applied to sheets of these conductive wires organized by cards or similar devices during warping, by the sheets being guided into a bath of the coating composition, then into a polymerization/drying area, before the said sheets come together to be juxtaposed.

In the case where the light modulation device consists of a color screen controlled by a multiplex matrix method, in which the pixels are distributed according to a regular network comprising at least three basic colors distributed regularly along the "lines" and "columns", it is advantageous for the layers containing the coloring pigments to have been applied to sheets of conductive wires organized on cards or similar devices during warping, by printing using flexography or any other process, the wires of a same sheet being given successive transversal imprints, the width of which corresponds to that of a pixel and which are formed with a required alternation of the colors, the imprints made on the different sheets being staggered so that the required regular distribution of the colored pixels appears on the final sheet obtained when the different sheets come together to be juxtaposed.

The means of supplying additional current within the working electrode(s) or the counter-electrode(s) if the latter is (or are) transparent consists advantageously of a grid of which the weft wires are conductive wires and the warp wires are nonconductive wires, or vice versa, the grid being applied to and fixed on to the associated working electrode(s) or the associated counter-electrode(s), the contact being effected advantageously along fine strips. To this end, it may be advantageous to use conductive wires with a square section.

Moreover, in the case where the conductive wires of the grid are provided with a sheath of plastic material able to yield and the non-conductive wires are made up of conductive wires of the same type, but covered with an insulating sheath, the yieldable sheath of the conductive wires is selected in a thermoplastic material and the sheath used to make the other wires non-conductive transversely is selected from a heat-resistant material of the enamel type or a material thermosetting at high temperature.

In the case of a light modulation device in which the working electrodes and counter-electrodes are arranged in a network of fine lines, forming respectively "columns" and "lines" for the purpose of controlling the device by a multiplex matrix method, the conductive wires are arranged so as to be in contact with the conductive parts and the non-conductive wires are arranged so as to be situated opposite the non-conductive parts separating the "lines" of the network of counter electrodes, the distance between the non-conductive wires corresponding to the spacing of the "lines" or a complete multiple of this spacing.

In one particular embodiment the conductive wires are arranged so as to be in contact with each of the conductive parts, along their two edges, two neighboring conductive wires intended to be applied to two adjacent conductive parts being connected by at least one other parallel non-conductive wire.

The invention also covers equipment for creating a counter electrode network in fine lines and its associated substrate, consisting of an assembly as described above, characterized in that it consists of a warping device in which the conductive wires and the non-conductive wires are arranged in sheets on cards or similar devices, then the sheets come together in one final sheet, the conductive and non-conductive wires being juxtaposed with the selected alternation on a cylinder equipped with notches, the final sheet then being rolled on to the drum of the warping device, if need be, collected on to an adhesive film, it being possible for at least one coating station and/or at least one printing station for the conductive wires to be arranged in the path of the sheets organized on cards or similar devices.

When there is no need to ensure a precise positioning of the grid in relation to the transparent electrode or counter-electrode, the grid may be fixed on the transparent plate covered with its conductive layer, for example, by means of a hot lamination operation causing the thermoplastic sheath to yield. However, if precise positioning is necessary, this device may not be adequate, which is why the invention also covers equipment for the manufacture of a network of transparent or substantially transparent electrodes or counter-electrodes, in a thin layer and in fine lines, to which is connected an additional current supply grid, as described above, and making it possible to create the final assembly of a screen or display unit, characterized in that it comprises:

- a work table perforated with holes arranged according to the network of the grid.
- A plate is arranged under the work table, parallel to the latter, bearing needles with sections corresponding approximately to the dimensions of a mesh of the grid. The plate is raised and lowered respectively in order to project the needles through the holes in the work table, for the purpose of positioning the grid on the latter, and to remove them, for the purpose of applying, on to the grid positioned in this way the transparent substrate on which the electrodes or counter-electrodes have previously been deposited.
- Means for supporting the transparent substrate is provided which is capable of lowering it onto the grid in position on the work table and capable of raising it once it has been made integral with the grid.
- Means of control is fitted on the work table and/or the means of support, in order to ensure an exact positioning of the conductive wires of the grid along the conductive lines of the network of electrodes and counter-electrodes.
- Means for applying heat and pressure to the grid/substrate unit is provided in the case where the conductive wires are provided with a thermoplastic sheath.

It is also possible to use the work table, once the grid/electrodes or counter-electrodes unit has been obtained, to take the network of counter electrodes and its substrate and the intermediate electrolytic layer(s), the means of support bearing the above-mentioned grid/electrodes or counter-electrodes unit then being lowered again on to the table for the purpose of making up the final assembly of the screen or display unit.

BRIEF DESCRIPTION OF THE DRAWINGS

To better illustrate the present invention, several embodiments will be described below, with reference to the attached drawings, in which.

DESCRIPTION OF PREFERRED EMBODIMENTS

Figure 1:
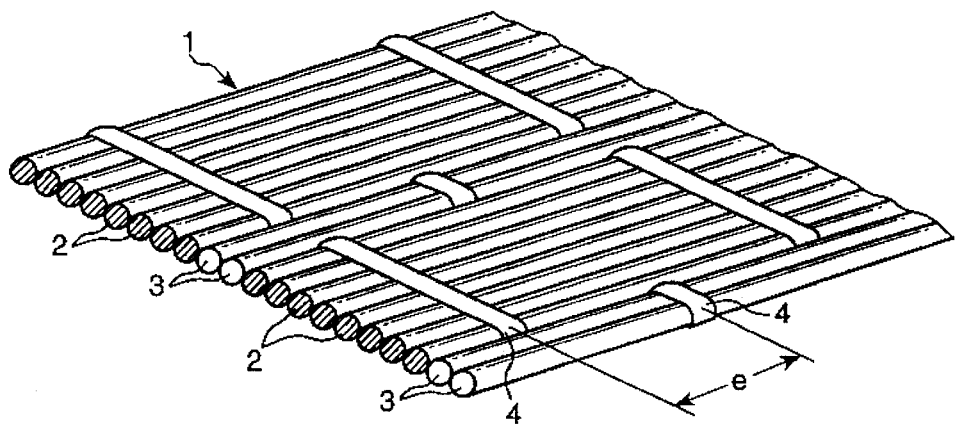
FIGS. 1 to 3 each represent a partial view in perspective, on an enlarged scale, of an embodiment of a network of counter-electrodes and its substrate for an electrochromic light modulation device according to the present invention.

FIG. 1 shows a fabric type assembly 1 the warp of which is made up of wires placed close against each other and arranged according to an alternation of n conductive wires 2 and p non-conductive wires 3, and the weft of which is made up of non-conductive wires 4, spaced regularly at a distance e, making a weft wire 4 pass over the groups of n adjacent conductive wires 2 of the warp and under the groups of p non-conductive wires 3, and the adjacent weft wire 4 inversely, in order to obtain the staggered arrangement as shown in FIG. 1.

The conductive wires 2 make up the network of counter-electrodes of light modulation devices which will be described below with reference to FIGS. 9 and 10, and the non-conductive wires 3 and 4 ensure the strength of conductive wires 2 according to a network of regular strips, the width of which is a function of the characteristics of the light modulation device to be created. The distance between the weft wires 4 is also a function of these characteristics.

In the example shown, if one is attempting to achieve pixels of 300 μm in width and 400 μm in height, the distance between the counter-electrodes being 100 μm, it is possible to select wires 2, 3 and 4 with a diameter of 50 μm, in which case n=8, p=2 and e is equal to 0.3 mm or a complete multiple of 0.3 mm.

Figure 2:
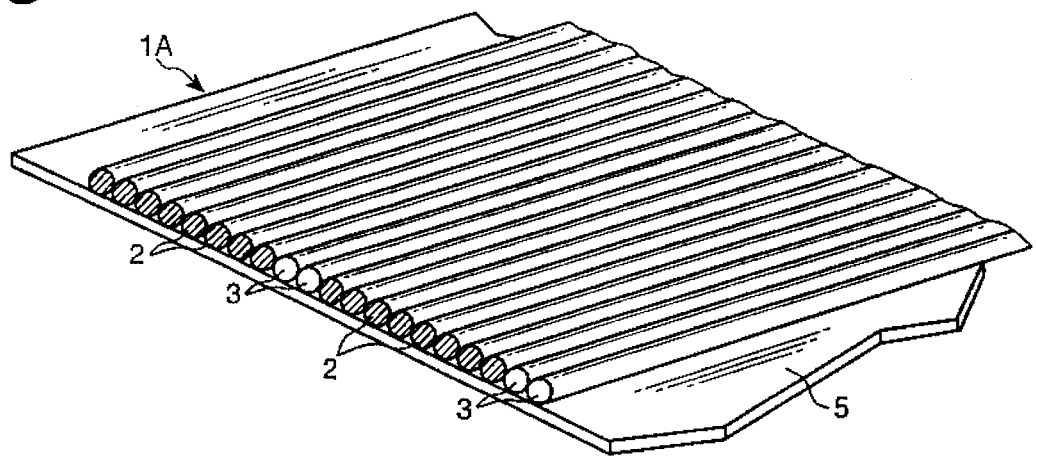

The variant shown in FIG. 2 differs from that in FIG. 1 by the fact that no weft wires 4 have been envisaged and that the conductive wires 2 alternating with the non-conductive wires 3 are applied to an adhesive film 5 which keeps them in the required regularity.

Figure 3:
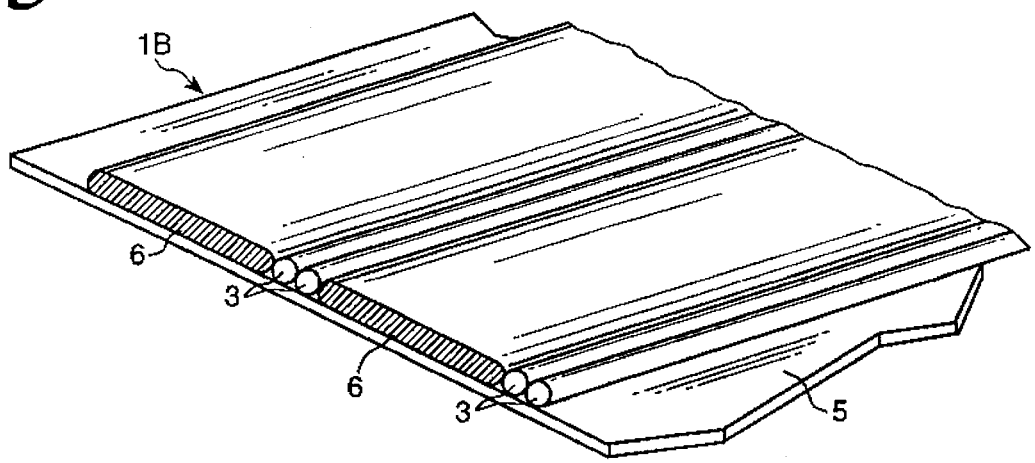

With regard to the variant shown in FIG. 3, it follows on from that of FIG. 2 by the fact that each group of n conductive wires 2 is replaced by a conductive strip 6 obtained by lamination from a wire of greater section. Thus, compared with the example of FIG. 1, each group of eight conductive wires is replaced by a strip 400 μm wide and 50 μm thick, obtained by lamination from a wire approximately $^{16}/_{100}$ mm in diameter.

Figure 4:
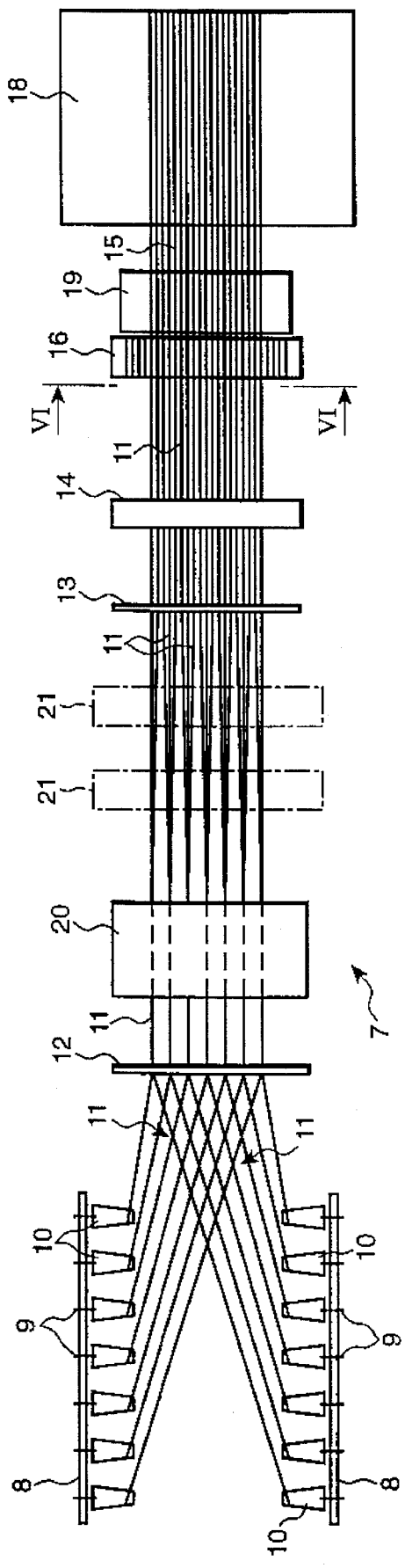
FIGS. 4 and 5 are schematic representations from below and in side elevation respectively of equipment for the manufacture of a network of counter-electrodes of the type of that shown in FIG. 2.
Figure 5:
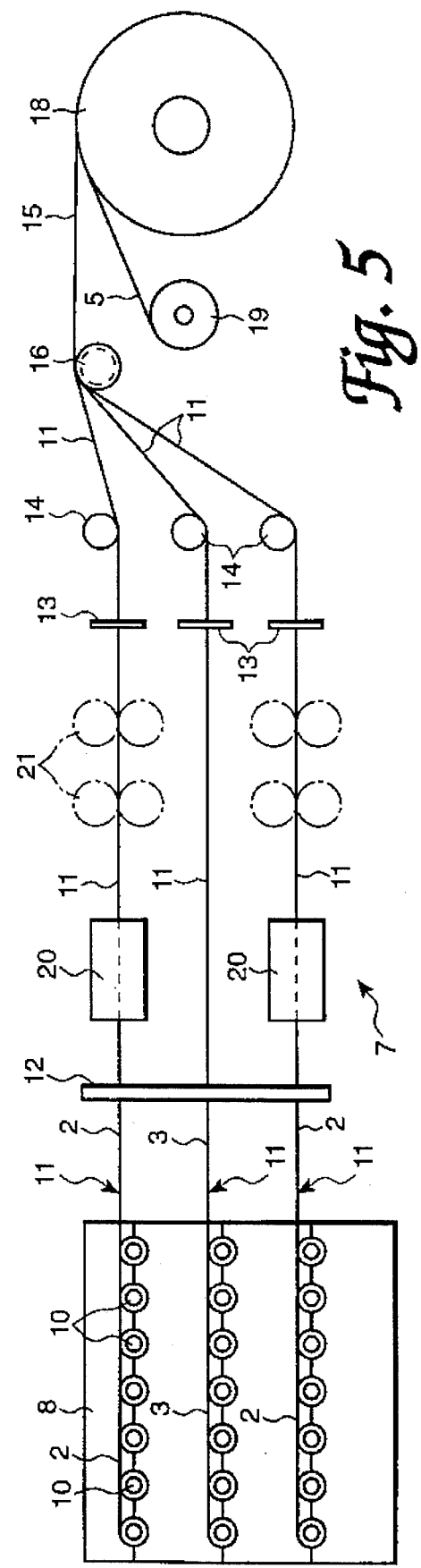

The warping device shown in diagram form in FIGS. 4 and 5 makes it possible to obtain assembly 1A of the sheet type in FIG. 2; assembly 1B of FIG. 3 is obtained following the same principle. With regard to assembly 1 of the cloth type, its warp is obtained on the warping device, and its weft is arranged with the aid of devices well known in the textile industry (looms).

Figure 6:
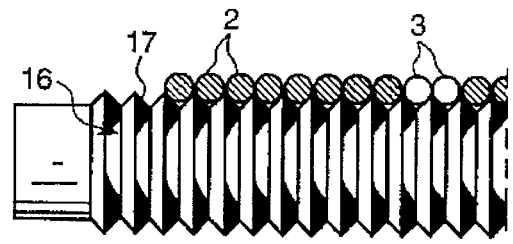
FIG. 6 is a partial cross-sectional view, on an enlarged scale, as viewed at line VI—VI of FIG. 4, of the notched cylinder fitted on the equipment of FIGS. 4 and 5.

The warping device 7 comprises, in the classic manner, creels 8 on which spindles 9 are installed. The different bobbins 10 of wires 2 and 3 are slipped on to spindles 9 and the tension of wires 2 and 3 is controlled according to their nature, the elasticity of non-conductive wires 3 not necessarily being the same as that of the conductive wires (or strips) 2. Wires 2 and 3 are organized into sheets 11 (three in number in the example shown), passing into the plate guide 12 perforated with eyelets or slots, then onto cards 13. After passing over or under guide cylinders 14 they are joined by interweaving to form the final sheet 15 where the conductive wires 2 and non-conductive wires 3 are juxtaposed alternately as required on a cylinder 16 bearing notches 17, as can be seen in section in FIG. 6. The final sheet 15 is then wound onto the drum 18 of the warping device, which takes it up simultaneously with the adhesive film 5 installed on a cylinder 19, and thus fixes the wires 2 and 3 side by side in the required arrangement.

As indicated above in connection with FIG. 2, it is possible, on the warping device 7, to replace groups of adjacent wires by a strip. In this event, the groups of n conductive wires 2 have been replaced by strips 6. Moreover, as indicated above in connection with FIG. 1, it is possible not to provide the adhesive film 5 on the warping device 7 and then to put in place, in the classic manner, a weft of non-conductive wires 4 by an additional weaving operation.

In addition, as indicated above, the conductive wires (or strips) 2, 6, may be covered in advance with some layers required for the introduction of the selected electrochromic process. This deposition may, however, also be effected during the actual warping operation. For this purpose it is sufficient to insert in the path of the suitably composed sheets 11, before they come together to be juxtaposed on the cylinder 16, a coating installation indicated in FIGS. 4 and 5 by the reference numeral 20, which may adopt very varied forms according to the nature of the wire and the coating. To apply a graphitized varnish, for example, the wires may be passed into a bath of the polymerizable liquid binder containing the graphite particles, then into a polymerization/drying area, by thermal or other means.

In addition, the separation of the sheets which the warping device makes possible, lends itself very well to the printing of some layers, for example, those which contain the colored pigments which must be distributed with a different composition on the adjacent pixels.

It is known that in a color screen the pixels are distributed according to a regular network which is made up of three or four basic colors distributed regularly along the "lines" and "columns". A specific pixel is of a different color from that of the pixels surrounding it.

Figure 7:
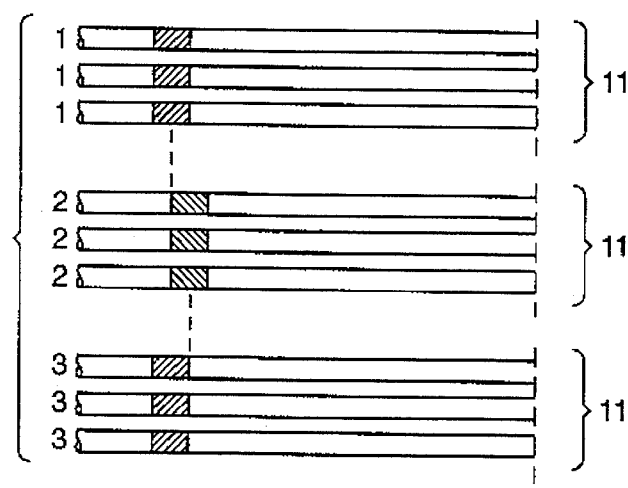
FIG. 7 is a diagram showing the formation, with the aid of a device of the type shown in FIGS. 4 and 5, of a network of counter-electrodes for a color display device.
Figure 8:
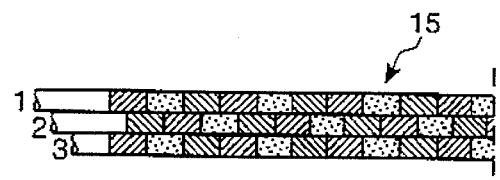
FIG. 8 represents, also in diagram form, the network thus obtained.

In the warping device it is possible to obtain sheets 11 of conductive wires (or strips) 2,6 corresponding to all the pixels which are of the same color on a specific line. In passing between the cylinders of a coloration unit 21, for example, one based on flexography, as indicated by mixed dashes in FIGS. 4 and 5, these sheets 11 are imprinted with fine lines 22, the width of which corresponds to the width of a pixel. The precision required of the printing only applies to the width of the line, as the adjacent wires (strips) which are to be given another color form part, at that moment, of another sheet 11 which passes between other cylinders 21. The perfect synchronization of the printing is achieved by a set of gears which controls the movements of the different cylinders. In FIGS. 7 and 8, the principle of the formation of these pixels in three colors is illustrated,   and  each representing blue, green and red pixels, from three sheets 11, which when passing through the installation 21 are given successive lines 22 of the three colors alternately, with a staggering of colors between the three sheets then being juxtaposed on the cylinder 16 in such a way that the required combination of colors is formed on the final sheet 15.

In addition, if desired, it is possible to give more strength to assemblies 1, 1A, 1B, by using for the nonconductive wires 3, 4, a fiber with a thermoplastic coating, and by passing the assembly between two rollers at a temperature close to the softening point of the thermoplastic material along the lines of the calendaring technique employed in the textile industry.

Figure 9:
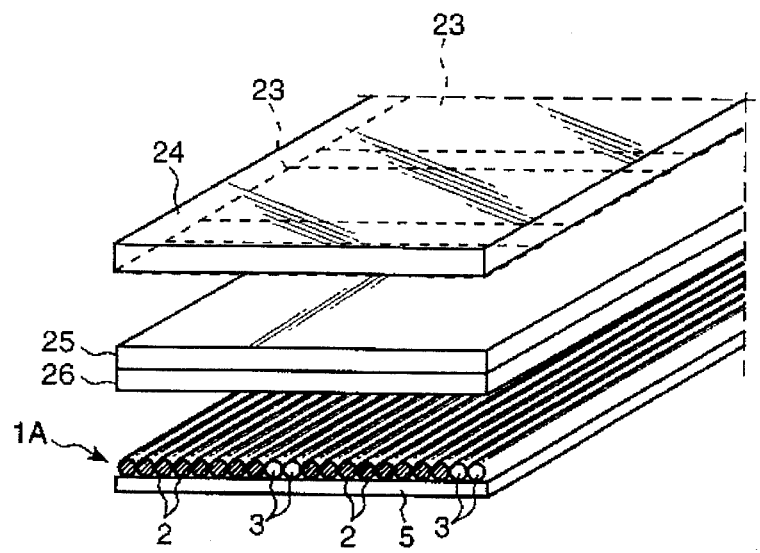
FIG. 9 is a partial perspective view, broken down, of an electrochromic light modulation device comprising the network of counter-electrodes of FIG. 2.

Assembly 1A of the counter-electrodes 2 and its associated substrate formed by the wires 3 and the adhesive film support 5 is shown in FIG. 9 in combination with the transparent electrode network 23, made up of a coating in fine lines of ITO for example, on a glass plate 24, electrolytic layers 25,26, having been interposed. By way of an example, it is possible to arrange electrolytic layers such as described in French Patent No. 2 618 571, for example, one of which contains a white pigment, such as titanium dioxide. The process may be applied, however, to other electrochromic systems described in the literature (Cf., for example, SAE Technical Paper Series 910542; and 910545—International Congress and Exposition, Detroit, Mich., 25 Feb.–1 Mar. 1991), such as those involving redox materials such as viologen, Prussian blue, electroactive polymers (polypyrrole, polythiophene), or other organic materials or again systems containing oxides transition metals, such as $WO_3$, $MoO^3$, $TiO_2$, $V_2O_5$, $Bi_2O_3$, $Pb_2$, $CuO^x$, $Ni(OH)_2$, $IrO_2$, $CoO_x$, and generally to all other electrochromic systems described in the literature.

Figure 10:
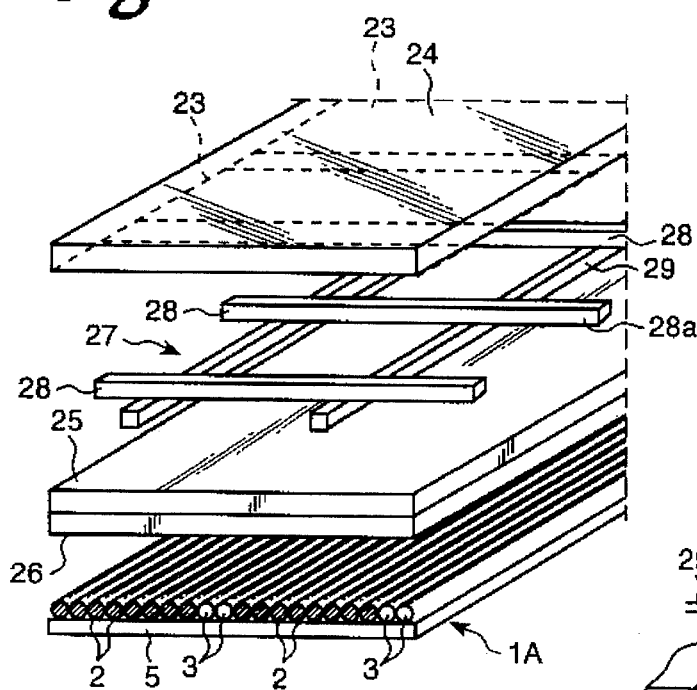
FIG. 10 is a similar view to that of FIG. 9, showing the electrochromic device fitted with a grid for supplying additional current to the network of transparent electrodes of this device.
Figure 11:
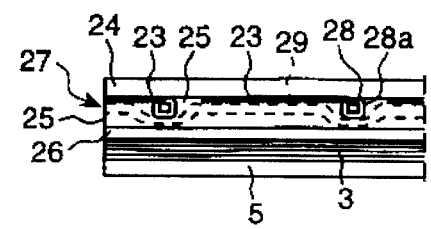
FIG. 11 is a partial side view of the device of FIG. 10 in assembled form.

FIGS. 10 and 11 show in diagrammatic form a screen or display according to the invention, also made up of pixels in large number controlled by a multiplex matrix method ("lines" and "columns"). This screen or display comprises means according to the invention for solving the problem of supplying current to points on the columns, in addition to the supply problems at the two ends. These means consist of a grid 27, of which the weft wires 28 are conductive and of which the warp wires 29 are nonconductive (or vice versa), and of which the mesh corresponds to the size of the pixels. (The warp—or weft—wires could, however, be separated by a distance equal to a multiple of the spacing in height of the pixels). This grid 27 is then fixed to a glass plate 24, where the "columns" 23 have already been traced in the transparent conductive layer, for example by depositing ITO under vacuum. As the grid 27 has a certain strength, the positioning of the conductive wires 28 with precision along each "column" is facilitated. Instead of having to place each wire in position, here it is possible to place the wire assembly together at one go, the grid 27 then being held in place, for example, by some spots of adhesive. The example referred to below describes a practical process which makes it possible to achieve this result.

It is advantageous to use as fine a conductive wire 28 as possible and consequently, for a given current to be transported, a wire made from a material with as little resistance as possible Silver or copper are to be recommended in particular. If the conductive wire 28 is made from a metal which is corrodible by the electrolyte, it must then be protected from the latter by inserting a sheath between the electrolyte 25, 26 and itself. But it is essential, however, that points of contact exist between the conductive layer 23 and the conductive wire 28 which serves to supply current to the parts of the "column" away from the edges of the screen. One of the ways of achieving this result in a simple manner consists of using for the construction of the grid 27 a conductive wire 28 which, if it is corrodible, is covered with a thermoplastic sheath 28a. This is what is shown in FIG. 11. To ensure the electrical contact between the conductive wire 28 and the transparent conductive layer strip 23 which it is to supply, it is sufficient to apply pressure to the grid 27 after it has been placed in position while heating the transparent plate 24: the thermoplastic sheath 28a yields and releases the metal along the contact generator.

The wires of grid 27 may advantageously be square in section, as shown in FIGS. 10 and 11, which permits better contact of the conductive wires 28 against transparent electrodes 23.

Figure 12:
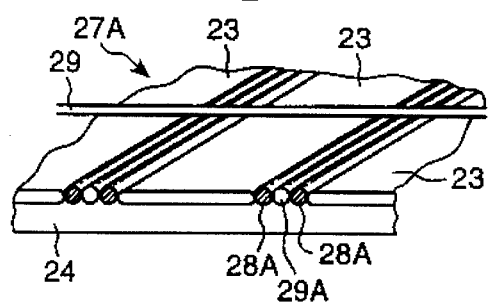
FIG. 12 is a diagrammatic view in partial perspective of a transparent substrate provided with a grid constructed according to a variant of that in FIGS. 10 and 11.

Moreover, as illustrated in FIG. 12, it is possible to replace the grid 27 by a grid 27A, the weft wires of which are made up of two conductive wires 28A connected by a parallel non-conductive wire 29A. The two wires 28A come to rest respectively against the edges of two adjacent "columns" 23, the intermediate wire 29A coming to rest against the non-conductive part of the substrate 24. The wires 28A might also be provided with a sheath 28a.

Figure 13:
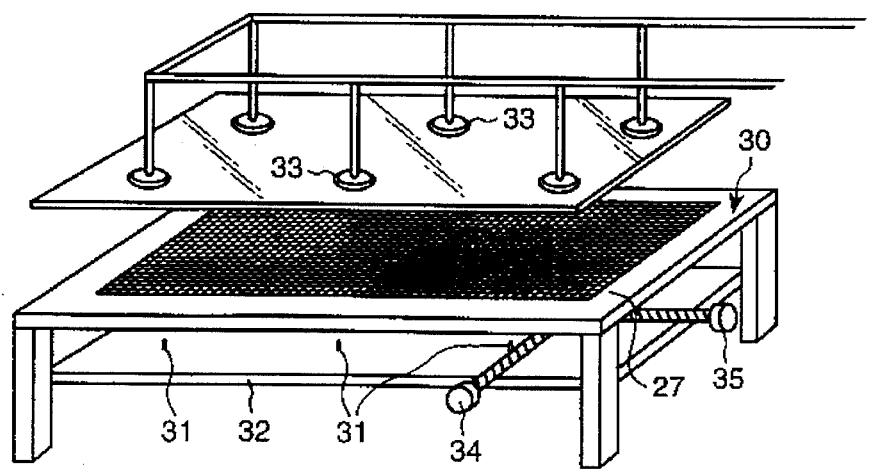
FIG. 13 is a diagrammatic view in perspective of equipment which can be used for assembling the device of FIG. 11, the needles for positioning the grid of FIGS. 10 and 11 being in the retracted position.
Figure 14:
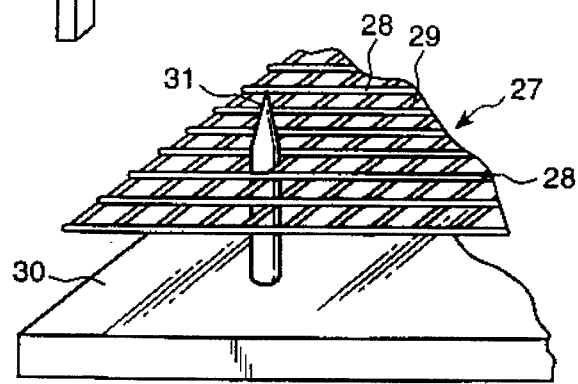
FIG. 14 is, on a larger scale, a view of a detail of the work table of the equipment of FIG. 13, the grid being shown in the course of being placed in position, its position being fixed by the above-mentioned needles projecting above the work table.

Thus, in its entirety, the practical creation of such a screen may be carried out, for example, according to the following process, described with reference to FIGS. 13 and 14:

1—A grid 27 is woven and made up as just described.

2—A work table 30 is installed, perforated by a network of holes through which may pass needles 31, the section of which (apart from the tapered end) is slightly less than the dimensions of a pixel, the holes being arranged according to the network of grid 27. The needles 31 are borne on a second plate 32, situated below the work table 30, and parallel with the latter. This second plate 32 is equipped with a device enabling it to be raised and lowered in order to project the needles 31 through the work table 30, or, on the contrary, to be removed.

3—The needles 31 being slightly projected, the grid 27 is placed in position, the needles 31 being inserted into the corresponding meshes; then the grid 27 is lowered into contact with the work table 30. Some spots of adhesive are arranged on the grid 27.

4—The glass plate 24 on which the "columns" 23 have been arranged in a conductive layer by one of the processes mentioned above, is then presented, with the conductive layer underneath, with the aid of a pneumatic or other device (suction cups 33 in FIG. 13), which holds it above and parallel to the work table 30. It is lowered into contact with the grid 27, while the needles 31 are withdrawn through the work table 30. This lowering movement is controlled at X and Y by a micrometric control device (as indicated at 34 and 35) which controls either the work table 30, or the suction cups 33 which hold the glass plate 24. In this way it is possible to adjust and stick the glass plate 24 on to the grid 27 so that the conductive wires 28 are placed exactly along the "columns" 23.

5—If need be, pressure is applied to the glass plate 24, while sweeping the surface with an infrared heater, the object of which is to yield the thermoplastic sheath 28a of the conductive wires 28 of the grid 27.

6—Separately, the substrate bearing the counter-electrodes of the screen is made, which will form its basic layer, for example the assembly of one the embodiments shown in FIGS. 1 to 3. After it has been placed on a film support, layers 25, 26 which make up the electrolytic medium and if need be, the layers of electrochromic material, are placed upon it. It will be remembered that these layers may have been placed directly on to the wires before warping or have been placed on the assembly 1, 1A or 1B during the warping process.

7—After the glass plate 24 has been raised by means of its prehensile device (the grid 27, which has become integral with it is also raised), the stack of layers made up in paragraph 6 is placed on the work table 30. Then the glass plate 24 is lowered again to form the "sandwich" which makes up the screen plate.

8—It is advisable to proceed with the sealing of the cut edges and to make the electrical connections. The latter are made, for the "columns" 23 by take up from the conductive wires 28 of the grid 27 and for the lines from the conductive wires 2 of the assembly 1, 1A or 1B. It may be advantageous to use, as a film support (indicated in paragraph 5 above) a printed circuit support card on which the control circuit of the screen is directly engraved.

It is clear that the embodiments described above are in no way restrictive and will therefore be able to lead to any desirable modification without going outside the framework of the invention.

I claim:

1. An electrochromic light modulation device comprising:

a first substrate including a woven assembly of a plurality of conductive wires and a plurality of non-conductive wires, said plurality of non-conductive wires being arranged in relation to said plurality of conductive wires so as to separate said plurality of conductive wires into a plurality of counter-electrodes;

at least one layer of electrolytic material exhibiting electrochromism, on said first substrate;

a second substrate which is substantially transparent, on said at least one layer of electrolytic material, said second substrate including a plurality of substantially transparent working electrodes thereon;

said plurality of working electrodes and said plurality of counter-electrodes forming a plurality of light modulation cells therebetween;

means for supplying electrical current to ends of each of said plurality of working electrodes; and means for supplying electrical current to ends of each of said plurality of counter-electrodes.

2. An electrochromic light modulation device according to claim 1, wherein:

said plurality of counter-electrodes are substantially transparent.

3. An electrochromic light modulation device according to claim 1, further comprising:

means for protecting said plurality of working electrodes from corrosion by said at least one layer of electrolytic material.

4. An electrochromic light modulation device according to claim 1, further comprising:

means for protecting said plurality of counter-electrodes from corrosion by said at least one layer of electrolytic material.

5. An electrochromic light modulation device according to claim 4, wherein:

said means for protecting said plurality of counter-electrodes from corrosion is a conductive varnish including particles of graphite in a polymerizable binder.

6. An electrochromic light modulation device according to claim 4, wherein:

said means for protecting said plurality of counter-electrodes from corrosion is a sheath of plastic material which is able to yield when heat and pressure are applied when placed in contact with said plurality of counter-electrodes.

7. An electrochromic light modulation device according to claim 1, wherein:

said plurality of counter-electrodes are formed of a material which is non-corrodible by the electrolytic material of the at least one layer of electrolytic material.

8. An electrochromic light modulation device according to claim 7, wherein:

said material of said plurality of counter-electrodes is a carbon fiber.

9. An electrochromic light modulation device according to claim 1, further comprising:

a first additional current supply assembly in electrical contact with said plurality of working electrodes, said first additional current supply assembly including a woven assembly of a plurality of conductive wires and a plurality of non-conductive wires, said plurality of conductive wires forming one of a weft and a warp of said woven assembly and said plurality of said non-conductive wires forming the other of said weft and said warp of said woven assembly.

10. An electrochromic light modulation device according to claim 9, further comprising:

a second additional current supply assembly in electrical contact with said plurality of counter-electrodes, said second additional current supply assembly including a woven assembly of a plurality of conductive wires and a plurality of non-conductive wires, said plurality of conductive wires forming one of a weft and a warp of said woven assembly and said plurality of said non-conductive wires forming the other of said weft and said warp of said woven assembly.

11. An electrochromic light modulation device according to claim 1, further comprising:

a first additional current supply assembly in electrical contact with said plurality of counter-electrodes, said first additional current supply assembly including a woven assembly of a plurality of conductive wires and a plurality of non-conductive wires, said plurality of conductive wires forming one of a weft and a warp of said woven assembly and said plurality of said non-conductive wires forming the other of said weft and said warp of said woven assembly.

12. An electrochromic light modulation device according to claim 11, wherein:

said plurality of non-conductive wires of said woven assembly are formed of a non-conducting fiber selected from a group consisting of glass, polyester and polyamide.

13. An electrochromic light modulation device according to claim 12, wherein said woven assembly further includes an external thermoplastic covering.

14. An electrochromic light modulation device according to claim 1, wherein:

said woven assembly is formed of alternately warped n adjacent conductive wires and p adjacent non-conductive wires, $n \geq 1$ and $p \geq 1$.

15. An electrochromic light modulation device according to claim 14, wherein:

said woven assembly of warped conductive wires is held together by a weft of non-conductive wires, a gap being formed between each of said alternately warped n adjacent conductive wires, an integer multiple of a width of said gap being equal to a pixel spacing along said warped conductive wires.

16. An electrochromic light modulation device according to claim 14, wherein:

said alternately warped n adjacent conductive wires are individually coated with a varnish.

17. An electrochromic light modulation device according to claim 1, wherein:

said woven assembly is formed of alternately warped conductive strips.

18. An electrochromic light modulation device according to claim 1, wherein said first substrate further comprises:

an adhesive film on a second surface of said woven assembly opposite a first surface of said woven assembly in contact with said at least one layer of electrolytic material.

19. An electrochromic light modulation device according to claim 18, further comprising:

coloring pigments printed on said woven assembly, a width between transversal imprints of said coloring pigments corresponding to a width of a pixel formed by alternation of said coloring pigments.

20. An electrochromic light modulation device according to claim 1, further comprising:

a first additional current supply assembly in electrical contact with said plurality of working electrodes, said first additional current supply assembly including a grid formed by said plurality of conductive wires as one of a weft and a warp, and said plurality of non-conductive wires as the other of said weft and said warp, said grid being fixed to said plurality of working electrodes so that a contact is effected along fine strips between said plurality of working electrodes and respective ones of said plurality of conductive wires.

21. An electrochromic light modulation device according to claim 20, further comprising:

a sheath of thermoplastic material covering said plurality of conductive wires of said grid.

22. An electrochromic light modulation device according to claim 21, wherein:

said plurality of non-conductive wires are conductive wires covered by an insulating sheath.

23. An electrochromic light modulation device according to claim 22, wherein:

said insulating sheath covering said plurality of non-conductive wires is formed of a material selected from a group consisting of an enamel and a material which thermosets at a temperature significantly higher than a temperature at which said sheath of thermoplastic material covering said conductive wires thermosets.

24. An electrochromic light modulation device according to claim 1, wherein:

said plurality of working electrodes and said plurality of counter-electrodes are arranged respectively into a perpendicular network of columns and lines, an integer multiple of a distance between said plurality of non-conductive wires corresponding to a spacing between each of said lines.

25. An electrochromic light modulation device according to claim 1, further comprising:

means of addressing said plurality of light modulation cells selectively controlling modulation of each of said plurality of light modulation cells.

26. A method of manufacturing an electrochromic light modulating device comprising steps of:

adhering a plurality of first conductive wires and a plurality of first non-conductive wires onto a supporting backing to form a first substrate;

providing an electrolytic material layer on said first substrate;

weaving a plurality of second conductive wires and a plurality of second non-conductive wires into a woven assembly, said plurality of second conductive wires being one of a warp and a weft of said woven assembly and said plurality of second non-conductive wires being the other of said warp and said weft;

aligning said plurality of second conductive wires of said woven assembly with working electrodes on a second substrate; and providing said second substrate including said working electrodes and said aligned woven assembly on said electrolytic material layer.

27. A method of manufacturing an electrochromic light modulating device according to claim 26, comprising a further step of:

coating at least one of said plurality of first conductive wires and said plurality of second conductive wires with a material to protect from corrosion by said electrolytic material layer.

28. A method of manufacturing an electrochromic light modulating device according to claim 26, comprising a further step of:

printing a color pigment on said plurality of first conductive wires.

29. Apparatus for manufacturing an electrochromic light modulating device comprising:

a work table perforated with a plurality of holes arranged according to a grid network;

a plate positioned beneath a top surface of said work table and parallel to said top surface of said work table, said plate including a plurality of needles each having a cross-sectional area corresponding approximately to a dimension of a mesh of said grid network, said plate being raised with respect to said top surface of said work table so that said needles project through respective ones of said plurality of holes of said work table;

means for supporting a substrate above said top surface of said work table, for lowering said substrate onto a woven assembly placed on said top surface of said work table, and for raising said substrate from said top surface of said work table after said woven assembly has been aligned and integrated with said substrate; and means for aligning said woven assembly with said substrate to ensure an exact positioning of a plurality of conductive wires of said woven assembly with a corresponding plurality of electrodes on said substrate.

30. Apparatus for manufacturing an electrochromic light modulating device according to claim 29, further comprising:

means for providing said plurality of conductive wires of said woven assembly with a thermoplastic sheath; and means for applying heat and pressure to said substrate integrated with said woven assembly provided with said thermoplastic sheath.

31. An electrochromic light modulation device comprising:

a first substrate which is substantially transparent and on which is formed a network of working electrodes as a thin layer in parallel fine lines referred to as "columns", said working electrodes being substantially transparent and being electronically conductive;

a second substrate which is placed at a distance transversally in relation to the first substrate and on which is formed a network of counter-electrodes in parallel fine lines referred to as "lines" said counter-electrodes being electronically conductive and being formed, as a woven assembly, by the conductive wires of a warp obtained by warping alternatively n adjacent conductive wires and p adjacent non-conductive wires, n and p each being at least equal to 1;

at least one layer of electrolytic material exhibiting electrochromism, being between said network of working electrodes and said network of counter-electrodes;

said working electrodes and said counter-electrodes being formed on their respective substrates and arranged each other in order to form a plurality of juxtaposed light modulation cells or pixels therebetween;

means for supplying electrical current to ends of each of said working electrodes;

means for supplying electrical current to ends of each of said counter-electrodes; and means for protecting externally said network of working electrodes, said network of counter-electrodes and said layer(s) of electrolytic material.

32. An electrochromic light modulation device according to claim 31, wherein groups of adjacent wires of said woven assembly are replaced by strips each obtained by lamination of a wire of a greater section.

33. An electrochromic light modulation device according to claim 31, wherein, on its surface opposite to that which is in contact with said at least one layer of electrolytic material, said warp of said woven assembly is made integral with an adhesive film, said adhesive film forming said second substrate.

34. An electrochromic light modulation device according to claim 31, wherein said warp of said woven assembly is held by a weft of non-conductive wires, the gap of said non-conductive wires being equal to the pixel spacing along said warp wires or to an integer multiple of said spacing.

35. An electrochromic light modulation device according to claim 31, consisting of a color screen controlled by a multiplex matrix method, said pixels being colored pixels distributed according to a regular network comprising at least three basic colors distributed regularly along said lines and said columns, wherein layers containing coloring pigments have been applied to the different primary sheets of the conductive wires organized on cards during warping for the formation of said network of counter-electrodes, the wires of the same primary sheet being given successive transversal imprints, the width of which corresponds to that of a pixel and which are formed with a required alternation of the colors, the imprints made on the different primary sheets being staggered so that the desired regular distribution of the colored pixels appears on the resulting sheet obtained when the different primary sheets come together to be juxtaposed.

36. An electrochromic light modulation device comprising:

a first substrate which is substantially transparent and on which is formed at least one working electrode as a thin layer, said working electrode(s) being substantially transparent and being electronically conductive;

a second substrate which is placed at a distance transversally in relation to the first substrate and on which is formed at least one counter-electrode, said counter-electrode(s) being electronically conductive;

at least one layer of electrolytic material exhibiting electrochromism, being between said working electrodes and said counter-electrodes;

said working electrodes and said counter-electrodes being formed on their respective substrates and arranged each other in order to form at least one light modulation cell or pixel therebetween;

means for supplying electrical current to ends of each of said working electrodes;

means for supplying additional electrical current within said at least one working electrode and being formed by the conductive wires of a grid assembly, applied and fixed onto said working electrode(s), of a plurality of conductives wires and a plurality of non-conductive wires, said plurality of conductive wires forming one of a weft and a warp of said grid assembly and said plurality of said non-conductive wires forming the other of said weft and said warp of said grid assembly;

means for supplying electrical current to ends of each of said counter-electrodes; and means for protecting externally said working electrodes, said counter-electrodes and said layer(s) of electrolytic material.

37. An electrochromic light modulation device comprising:

a first substrate which is substantially transparent and on which is formed at least one working electrode as a thin layer, said working electrode(s) being substantially transparent and being electronically conductive;

a second substrate which is substantially transparent and which is placed at a distance transversally in relation to the first substrate and on which is formed at least one counter-electrode, said counter-electrode(s) being transparent and being electronically conductive;

at least one layer of electrolytic material exhibiting electrochromism, being between said working electrodes and said counter-electrodes;

said working electrodes and said counter-electrodes being formed on their respective substrates and arranged each other in order to form at least one light modulation cell or pixel therebetween;

means for supplying electrical current to ends of each of said working electrodes;

means for supplying electrical current to ends of each of said counter-electrodes;

means for supplying additional current within said at least one counter-electrode and being formed by the conductive wires of a grid assembly, applied and fixed onto said counter-electrodes, of a plurality of conductives wires and a plurality of non conductive wires, said plurality of conductive wires forming one of a weft and a warp of said grid assembly and said plurality of said non-conductive wires forming the other of said weft and said warp of said grid assembly; and means for protecting externally said working electrodes, said counter-electrodes and said layer(s) of electrolytic material.

38. An electrochromic light modulation device according to claim 36, wherein said second substrate is substantially transparent and said at least one counter-electrode is transparent and further comprising means for supplying additional current within said at least one counter-electrode and being formed by the conductive wires of a grid assembly, applied and fixed onto said counter-electrodes, of a plurality of conductives wires and a plurality of non conductive wires, said plurality of conductive wires forming one of a weft and a warp of said grid assembly and said plurality of said non-conductive wires forming the other of said weft and said warp of said grid assembly.

39. An electrochromic light modulation device according to claim 31 or claim 37, further comprising means for supplying additional electric current within said working electrodes and being formed by the conductive wires of a grid assembly, applied and fixed onto said working electrodes, of a plurality of conductive wires and a plurality of non conductive wires, said plurality of conductive wires forming one of a weft and a warp of said grid assembly and said plurality of said non-conductive wires forming the other of said weft and said warp of said grid assembly.

40. An electrochromic light modulation device according to one of claims 36 to 38, wherein said grid is fixed to said electrodes or counter-electrodes so that a contact is effected along fine strips between said electrodes or counter-electrodes and said conductive wires of said grid.

41. An electrochromic light modulation device according to one of claims 31 and 36 to 38, wherein said conductive wires are non-corrodible conductive wires selected among carbon fibers and wires of a metal or alloy non corroded by the electrolytic medium chosen.

42. An electrochromic light modulation device according to claim 31, wherein said conductive wires are wires made of a conductive metal each protected from contact with said at least one layer of electrolytic material, by a conductive varnish.

43. An electrochromic light modulation device according to claim 31, wherein a layer of a conductive varnish has been fixed to primary sheets of said conductive wires when organized on cards during warping.

44. An electrochromic light modulation device according to claim 43, wherein said conductive varnish includes particles of graphite in a polymerizable binder.

45. An electrochromic light modulation device according to one of claims 36 to 38, wherein said conductive wires of said grid are made from a corrodible wire and are provided with a sheath of plastic material which is able to yield when heat and pressure are applied when it is placed in contact with said electrode(s) or counter-electrode(s) to release the conductor along the contact generators.

46. An electrochromic light modulation device according to one of claims 31 and 36 to 38, wherein said non conductive wires are non conductive fibers selected from a group consisting of glass, polyester and polyamide fibers and optionally including an external thermoplastic covering.

47. An electrochromic light modulation device according to one of claims 31 and 36 to 38, wherein said non conductive wires are made of conductive metal wires or fibers covered with an insulating sheath.

48. An electrochromic light modulation device according to claim 47, wherein said insulating sheath is selected from a group consisting of an enamel and a thermosetting material.

49. An electrochromic light modulation device according to one of claim 36 to 38, wherein said working electrodes are arranged as a thin layer in parallel fine columns and said counter-electrodes are arranged as a thin layer in parallel fine lines, said working electrodes and said counter-electrodes being formed on their respective substrates and arranged each other in order to form a plurality of juxtaposed light modulation cells or pixels therebetween.

50. An electrochromic light modulation device according to claim 49, wherein conductive wires of a grid associated to a network of working electrodes are arranged so as to be in contact with the conductive parts of said columns and said non-conductive wires are arranged so as to be situated opposite the non-conductive parts separating the lines of said network of counter-electrodes, the distance between the non-conductive wires corresponding to the spacing of the lines or an integer multiple of said spacing.

51. An electrochromic light modulation device according to claim 50, wherein said grid is arranged so that two conductive wires are in contact with each of the columns, one conductive wires on each side of a column, two neighbouring conductive wires intended to be applied to two adjacent columns being linked by means of at least one other parallel non-conductive wire.

52. An electrochromic light modulation device according to claims 31, further comprising means of addressing said juxtaposed light modulation cells selectively controlling modulation of each of said light modulation cells.

* * * * *